United States Patent [19]

Mies et al.

[11] Patent Number: 5,661,469
[45] Date of Patent: Aug. 26, 1997

[54] COUPLING DEVICE, SYSTEM, AND METHOD FOR COUPLING A TERMINAL TO A GENERATING DEVICE

[75] Inventors: Ronald Johannes Maria Mies, Leidschendam; Dolf Albert Schinkel, Hillegom, both of Netherlands

[73] Assignee: Koninklijke PTT Nederland N.V., Netherlands

[21] Appl. No.: 412,958

[22] Filed: Mar. 29, 1995

[30] Foreign Application Priority Data

May 6, 1994 [NL] Netherlands ............................ 9400750

[51] Int. Cl.$^6$ ..................................................... H04Q 1/00
[52] U.S. Cl. ........................ 340/825.53; 348/16
[58] Field of Search .................. 340/825.24, 825.25, 340/825.53; 348/14, 16; 395/200.18, 200.2, 831, 885, 890, 850

[56] References Cited

FOREIGN PATENT DOCUMENTS

| 0523629 | 1/1993 | European Pat. Off. . |
| 0571119 | 11/1993 | European Pat. Off. . |

OTHER PUBLICATIONS

Draft prETS 300145, Integrated Services Digital Network (ISDN), Audiovisual Services, Videotelephone Systems and Terminal Equipment Operating on One or Two 64 kbit/s Channels (referring to H-320, G-711, G-722 and G-728), Jul. 1993.

Draft prETS 300144, Integrated Services Digital Network (ISDN), Audiovisual Services, Frame Structure for a 64 to 1920 kbit/s Channel and Associated Syntax for Inband Signalling (referring to H-211), Jul. 1993.

Draft prETS 300143, ISDN, Audiovisual Services, Inband Signalling Procedures for Audiovisual Terminals Using Digital channels up to 2048 kbit/s (referring to H-242), Jul. 1993.

Draft prETS 300142, ISDN, Audiovisual Services, Video-codec for audiovisual services at p*64 kbit/s (referring to H-261) Sep. 1992.

Takizawa et al., "Desktop All-in-One, Color Moving-Picture Videophone", *Hitachi Review*, vol. 40 (1991), No. 3, pp. 257-262.

Weiss, "Desk Top Video Conferencing—An Important Feature of Future Visual Communications", *IEEE International Conference on Communications ICC '90*, Atlanta, Georgia, Apr. 19, 1990, pp. 0134-0139.

*Primary Examiner*—Brian Zimmerman
*Attorney, Agent, or Firm*—Michaelson & Wallace; Peter L. Michaelson; John C. Pokotylo

[57] ABSTRACT

A coupling device for coupling a videotelephone with a video generation device. The coupling device includes (i) a first device, for detecting at least one code word contained in a signal originating from the videotelephone, (ii) a second device, coupled with the first device, for generating a control signal in response to the detected code word, and (iii) a change-over device. The change-over device is coupled with the first device and with the second device. The change-over device receives, from the video generating device, both a first video signal, coded in a first manner, and a second video signal, coded in a second manner. The change-over device then feeds, in response to a control signal, coded video signals originating from one of a number of video generating devices to the first device via the change-over device. The coupling device is readily applicable in multicast environments.

14 Claims, 2 Drawing Sheets

COUPLING DEVICE, SYSTEM, AND METHOD FOR COUPLING A TERMINAL TO A GENERATING DEVICE

BACKGROUND OF THE INVENTION

The invention relates to a coupling device for coupling a terminal, such as, for example, a videotelephone, to generating means for generating, at least, a first signal coded in a first manner and a second signal coded in a second manner. The coupling device is provided with first means for detecting at least one code word contained in a signal originating from the terminal, and second means, coupled to the first means, for generating a control signal in response to at least a detected code word.

Such a coupling device is generally known and relates, for example, to a section of a further videotelephone, in which case the generating means are formed by another section of said further videotelephone. The section of said further videotelephone, which forms the coupling device, comprises a so-called H-221 unit (the first means) which (in one direction) detects at least one code word contained in a signal originating from the terminal, and comprises a so-called H-242 unit (the second means) which, in response to the detected code word originating from the H-221 unit and fed to the H-242 unit, generates a control signal. The other section of said further videotelephone, which forms the generating means, comprises a so-called H-261 unit and a video signal source, such as, for example, a camera. The H-261 unit codes a video signal, which originates from the video signal source, in a specific manner as a function of the control signal originating from the H-242 unit and therefore generates at least either a first video signal coded in a first manner or a second video signal coded in a second manner, after which the video signal which has been coded in a manner appropriate for the terminal is fed to the H-221 unit which (in the other direction) inserts at least one further code word into said coded video signal originating from the generating means and intended for the terminal.

This known coupling device has the drawback, inter alia, that it has been especially designed for a one-to-one communication, in other words that the only option it provides as a component of a videotelephone is that of communication with one other videotelephone.

SUMMARY OF THE INVENTION

It is an object of the invention, inter alia, to provide a coupling device for coupling a terminal to generating means for generating a first signal coded in a first manner and a second signal coded in a second manner, which provides the option of being used in a so-called multicast environment.

The coupling device according to the invention, to this end is characterized in that the coupling device is provided with change-over means coupled to the first means and to the second means, for receiving, at least, both the first signal coded in a first manner and the second signal coded in a second manner and for feeding, in response to at least a control signal, at least a video signal originating from the generating means to the first means via the change-over means.

As a result of the change-over means receiving both the first video signal which is coded in a first manner and originates from a first H-261 unit coupled to a video signal source, and receiving the second video signal which is coded in a second manner and originates from a second H-261 unit coupled to the same video signal source, and by feeding, in response to the control signal, one of said coded signals to the H-221 unit, a coupling device is obtained which is readily applicable in a multicast environment. Although it is still necessary for one coupling device to be present per terminal, the number of H-261 units required is greatly reduced by the change-over means being used, specifically being reduced to the number which is equal to the number of different possible terminal video standards and/or terminal video standard modes. By using the coupling device according to the invention, it is possible for thousands of terminals, which each, for example, are based on one of the three different terminal video standards and/or terminal video standard modes, to be coupled to one and the same video signal source, which does, admittedly, require a coupling device per terminal, but only three H-261 units. If known coupling devices were to be used, the first-mentioned example would require both a coupling device and an H-261 unit per terminal. Since an H-261 unit is very many times more expensive than the change-over means, the coupling device according to the invention provides a major economic advantage.

The invention is based, inter alia, on the insight that terminals such as the present-day videotelephones are based on different terminal video standards and/or terminal video standard modes and that in a multicast environment the video signal originating from one and the same video signal source need be coded only once per terminal video standard and/or terminal video standard mode, in contrast to the conventional procedure of coding said video signal once per terminal. The invention solves the problem of how to efficiently use terminals based on different terminal video standards and/or terminal video standard modes and terminal audio standards in a multicast environment.

A first embodiment of the coupling device according to the invention is characterized in that the coupling device is provided with third means for receiving a further signal originating from further generating means and for feeding said further signal to the first means.

The further generating means form, for example, yet another section of the further videotelephone and comprise an audio coding unit and an audio signal source such as, for example, a microphone. The audio coding unit codes an audio signal originating from the audio signal source and therefore generates the further signal which is fed to the H-221 unit. In this case, a direct coupling (the third means) is present between the H-221 unit and the audio coding unit, and it is a matter of one terminal audio standard, where in a multicast environment the audio signal originating from one and the same audio signal source need be coded only once per terminal audio standard, in contrast to the conventional procedure of coding said audio signal once per terminal.

A second embodiment of the coupling device according to the invention is characterized in that the third means comprise further change-over means coupled to the first means and to the second means, for receiving, at least both a first further signal originating from the further generating means and coded in a first manner and a second further signal originating from the further generating means and coded in a second manner and for feeding, in response to at least a further control signal originating from the second means, at least a coded further signal originating from the further generating means to the first means via the further change-over means.

As a result of the further change-over means receiving both the first audio signal, which is coded in a first manner and originates from a first G-711 unit coupled to a audio signal source, and receiving the second audio signal, which is coded in a second manner and originates from a second G-722 unit coupled to the same audio signal source, and by feeding, in response to the further control signal, one of said coded further signals to the H-221 unit, a coupling device is obtained which is yet more readily applicable in a multicast environment. Although it is still necessary for one coupling device to be present per terminal, the number of audio coding units required is, however, greatly reduced by the further change-over means being used, specifically being reduced to the number which is equal to the number of different possible terminal audio standards. By using the coupling device according to the invention, it is possible for thousands of terminals, which each, for example, are based on one of the three different terminal audio standards, to be coupled to one and the same audio signal source, which does, admittedly, require a coupling device per terminal, but only one G-711, G-722 and G-728 unit.

A third embodiment of the coupling device according to the invention is characterized in that the first means are provided with a first in/output for coupling to the terminal, a second in/output for coupling to an in/output of the second means, an input for coupling to an output of the change-over means, a further input for coupling to a further output of the further change-over means, the second means being provided with a control output for coupling to a control input of the change-over means, and a further control output for coupling to a further control input of the further change-over means, which change-over means are provided with a first input for receiving the first signal coded in a first manner, and a second input for receiving the second signal coded in a second manner, and which further change-over means are provided with a first further input for receiving the first further signal coded in a first manner, and a second further input for receiving the second further signal coded in a second manner.

The invention further relates to a system for coupling to at least one terminal and comprising generating means for generating, at least, a first signal coded in a first manner and a second signal coded in a second manner.

The system according to the invention is characterized in that the system is provided with at least a first coupling device and a second coupling device which are each provided with first means for detecting at least one code word contained in a signal originating from a terminal, second means, coupled to the first means, for generating a control signal in response to at least a detected code word, and change-over means coupled to the first means and to the second means, for receiving, at least, both the first signal coded in a first manner and the second signal coded in a second manner and for feeding, in response to at least a control signal, at least a coded signal originating from the generating means to the first means via the change-over means.

A first embodiment of the system according to the invention is characterized in that the system is provided with further generating means for generating, at least, a further signal, the first coupling device and the second coupling device each being provided with third means for receiving the further signal originating from the further generating means and for feeding said further signal to the first means.

A second embodiment of the system according to the invention is characterized in that the third means comprise further change-over means coupled to the first means and to the second means, for receiving, at least, both a first further signal originating from the further generating means and coded in a first manner and a second further signal originating from the further generating means and coded in a second manner and for feeding, in response to at least a further control signal originating from the second means, at least a coded further signal originating from the further generating means to the first means via the further change-over means.

A third embodiment of the system according to the invention is characterized in that the system is provided with switching means which are provided with at least two terminal in/outputs, each for coupling to a terminal, and at least two coupling device in/outputs, each for coupling to a coupling device.

Via the switching means, such as an exchange known to those skilled in the art, it is possible for at most a specific number of terminals (which number is equal to the number of terminal in/outputs), each having a separate coupling device, to be interconnected.

The invention yet further relates to a method for setting up, via a coupling device, a connection between a terminal and generating means for generating, at least, both a first signal coded in a first manner and a second signal coded in a second manner.

The method according to the invention is characterized in that the method comprises the following steps of:

the terminal transmitting to the coupling device a signal which comprises at least one code word, the coupling device receiving the signal which comprises at least one code word, the coupling device detecting the code word and, in response thereto, generating a control signal, the generating means transmitting, to the coupling device, both the first signal coded in a first manner and the second signal coded in a second manner, and one of the coded signals received by the coupling device being fed, in response to the control signal, to the terminal.

A first embodiment of the method according to the invention is characterized in that the method comprises further steps of further generating means transmitting a further signal to the coupling device, and the further signal received by the coupling device being fed to the terminal.

A second embodiment of the method according to the invention is characterized in that the method comprises further steps of further generating means transmitting, to the coupling device, both a first further signal coded in a first manner and a second further signal coded in a second manner, and one of the coded further signals received by the coupling device being fed, in response to the control signal, to the terminal.

The invention also relates to a further method for setting up, via at least a first and second coupling device, respectively, a connection between, on the one hand, at least a first and a second terminal, respectively, and, on the other hand, generating means for generating, at least, both a first signal coded in a first manner and a second signal coded in a second manner.

The further method according to the invention is characterized in that the method comprises the following steps of:

the first terminal transmitting to the first coupling device a signal which comprises at least one first code word, the first coupling device receiving the signal which comprises at least one first code word, the first coupling device detecting the first code word and, in response thereto, generating a first control signal, the generating means transmitting, to the first coupling device, both the first signal coded in a first manner and the second signal coded in a second manner, the first signal coded in a first manner being fed, in response to the first control signal, to the first terminal, the second terminal transmitting to the second coupling device a signal which comprises at least one second code word, the second coupling device receiving the signal which comprises at least one second code word, the second coupling device detecting the second code word and, in response thereto, generating a second control signal, the generating means transmitting, to the second coupling device, both the first signal coded in a first manner and the second signal coded in a second manner, and the second signal coded in a second manner being fed, in response to the second control signal, to the second terminal.

A first embodiment of the further method according to the invention is characterized in that the method comprises further steps of further generating means transmitting a further signal to the first coupling device, and the further signal received by the first coupling device being fed to the first terminal, the further generating means transmitting the further signal to the second coupling device, and the further signal received by the second coupling device being fed to the second terminal.

A second embodiment of the further method according to the invention is characterized in that the method comprises further steps of further generating means transmitting, to the first coupling device, both a first further signal coded in a first manner and a second further signal coded in a second manner, the first further signal coded in a first manner received by the first coupling device being fed, in response to the first control signal, to the first terminal, the further generating means transmitting, to the second coupling device, both the first further signal coded in a first manner and the second further signal coded in a second manner, and the second further signal coded in a second manner received by the second coupling device being fed, in response to the second control signal, to the second terminal.

References

Draft prETS 300145, Integrated Services Digital Network (ISDN),
Audiovisual Services, Videotelephone Systems and Terminal Equipment Operating on One or Two 64 kbit/s Channels (referring to H-320, G-711, G-722 and G-728).

Draft prETS 300144, Integrated Services Digital Network (ISDN),
Audiovisual Services, Frame Structure for a 64 to 1920 kbit/s Channel and Associated Syntax for Inband Signalling (referring to H-211).

Draft prETS 300143, Integrated Services Digital Network (ISDN),
Audiovisual Services, Inband Signalling Procedures for Audiovisual Terminals Using Digital channels up to 2048 kbit/s (referring to H-242).

Draft prETS 300142, Integrated Services Digital Network (ISDN),
Audiovisual Services, Videocodec for audiovisual services at p*64 kbit/s (referring to H-261).

Dutch patent application 9400750 (priority document).

All references are deemed to be incorporated in the present patent application.

BRIEF DESCRIPTION OF THE INVENTION

The invention will be explained in more detail with reference to a specific embodiment depicted in the figures, in which:

FIG. 1 shows a system according to the invention which is coupled to three terminals and comprises generating means, further generating means and three coupling devices, and FIG. 2 shows a coupling device according to the invention, comprising first means, second means, change-over means and further change-over means.

DETAILED DESCRIPTION

Figure 1:
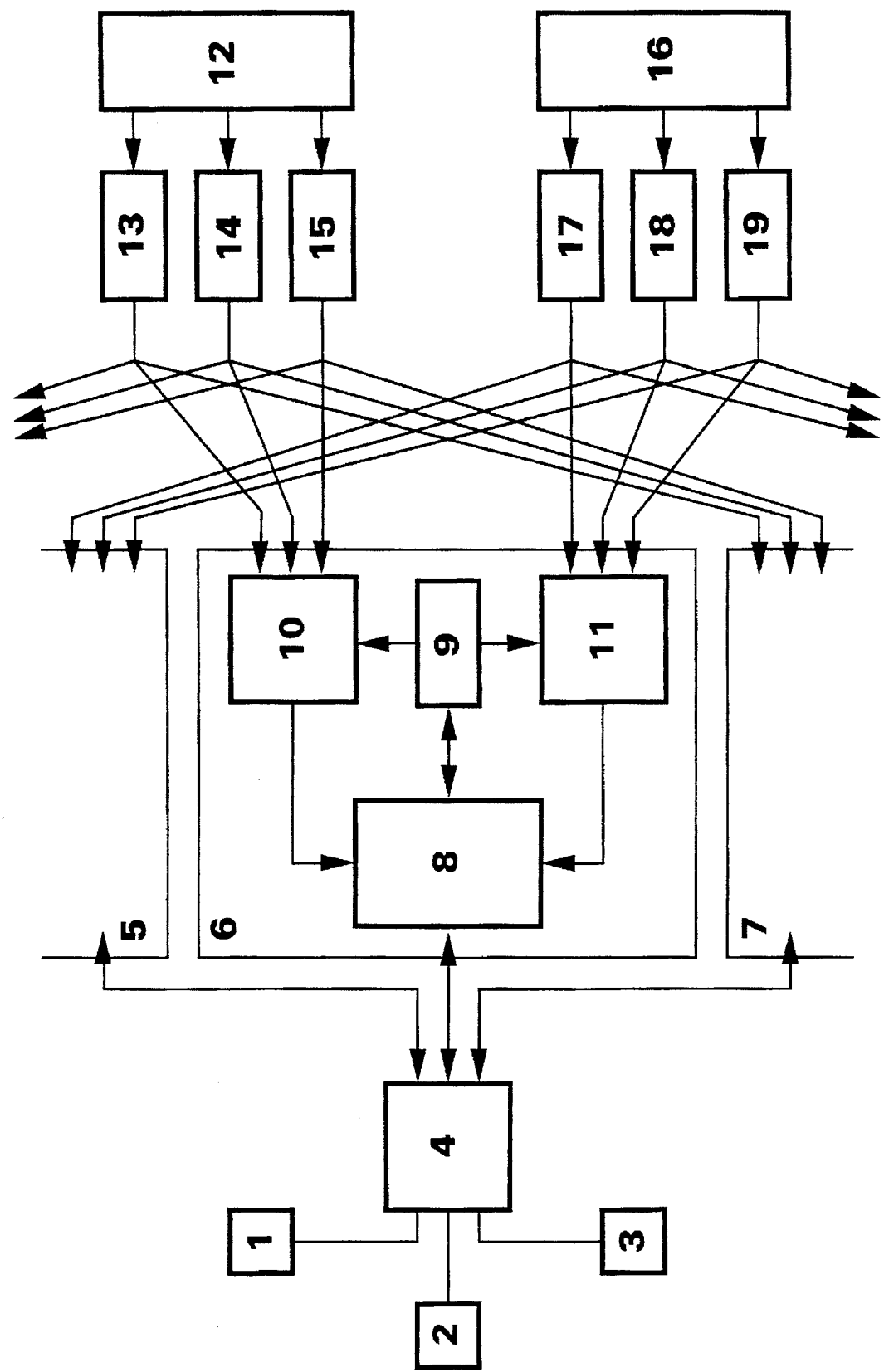

The system depicted in FIG. 1 is equipped with switching means 4 which are provided with three terminal in/outputs which are coupled, respectively, to terminal 1, terminal 2 and terminal 3, for example via ISDN links. The terminals 1, 2 and 3 are, for example, videotelephones which are based on different terminal video standards and/or terminal video standard modes and terminal audio standards. Switching means 4, which are formed, for example, by an exchange, are further provided with three coupling device in/outputs which are coupled, respectively, to coupling device 5, coupling device 6 and coupling device 7. Coupling devices 5, 6 and 7 are each equipped with first means 8 for detecting at least one code word contained in a signal originating from the terminal, which first means 8 are coupled to switching means 4, with second means 9 coupled to first means 8 for generating a control signal in response to at least a detected code word, with change-over means 10 coupled to first means 8 and second means 9, and with further change-over means 11 coupled to first means 8 and second means 9. The system depicted in FIG. 1 further comprises generating means 12, 13, 14 and 15 and further generating means 16, 17, 18 and 19. Generating means 12, 13, 14 and 15 consist of a video signal source 12 which generates a video signal which is fed to first video coding unit 13, second video coding unit 14 and third video coding unit 15, each of which code the video signal in accordance with a different terminal video standard and/or terminal video standard mode. Further generating means 16, 17, 18 and 19 consist of an audio signal source 16 which generates an audio signal which is fed to first audio coding unit 17, second audio coding unit 18 and third audio coding unit 19, each of which code the audio signal in accordance with a different terminal audio standard. The video signal coded in a first manner by first video coding unit 13 is fed to a first input of change-over means 10, the video signal coded in a second manner by second video coding unit 14 is fed to a second input of change-over means 10, and the video signal coded in a third manner by third video coding unit 15 is fed to a third input of change-over means 10. The audio signal coded in a first manner by first audio coding unit 17 is fed to a first input of further change-over means 11, the audio signal coded in a second manner by second audio coding unit 18 is fed to a second input of further change-over means 11, and the audio signal coded in a third manner by third audio coding unit 19 is fed to a third input of further change-over means 11. First means 8 consist, for example, of a so-called H-221 unit, second means 9 comprise, for example, a so-called H-242 unit, first, second and third video coding unit 13, 14 and 15 each consist, for example, of a so-called H-261 unit which each time is set to a different terminal video standard and/or terminal video standard mode, first audio coding unit 17 consists, for example, of a so-called G-711 unit, second audio coding unit 18 consists, for example, of a so-called G-722 unit, and third audio coding unit 19 consists, for example, of a so-called G-728 unit.

Figure 2:
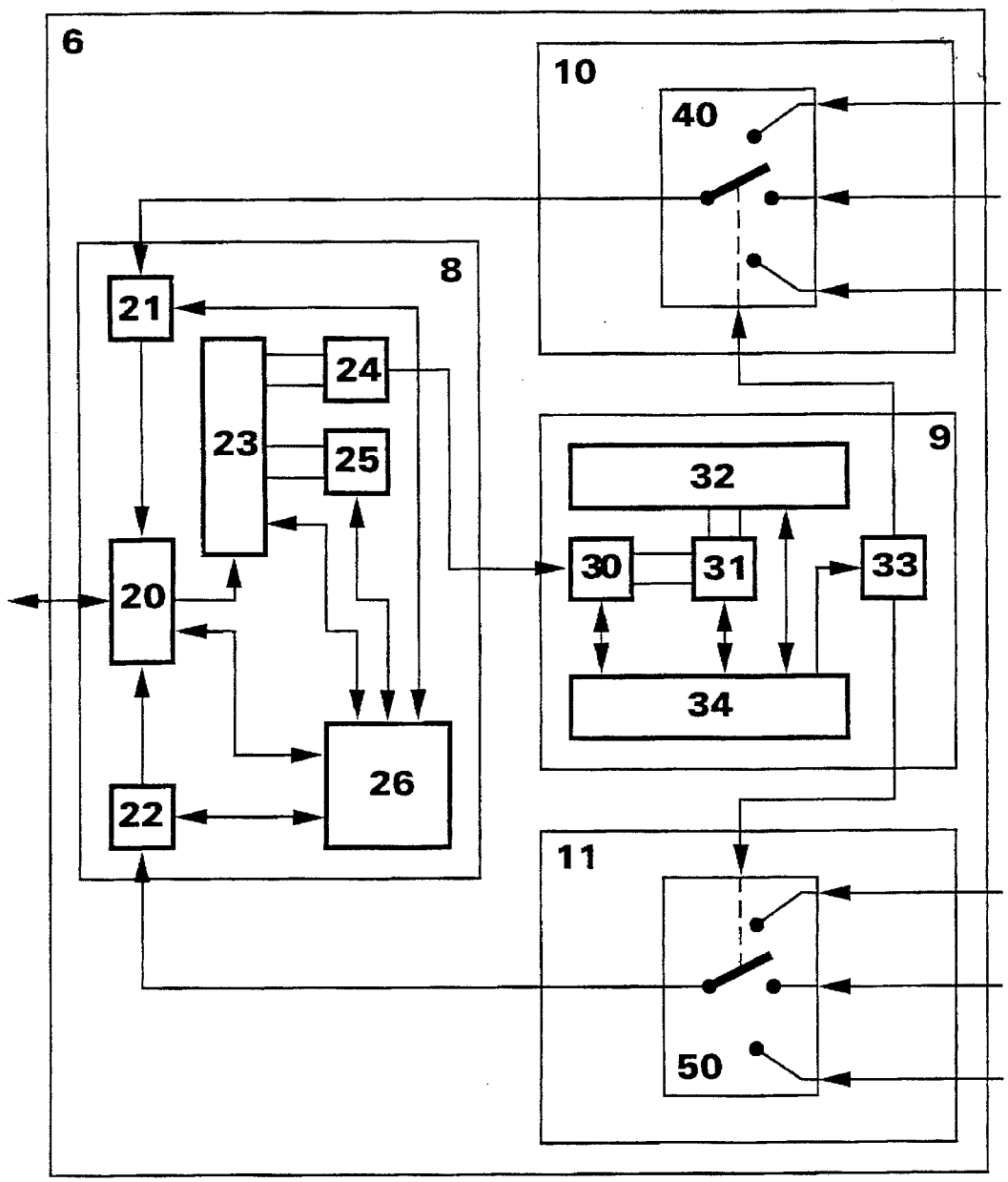

The coupling device 6 depicted in FIG. 2 comprises first means 8 such as, for example, a so-called H-221 unit, second means 9 which comprise, for example, a so-called H-242 unit, change-over means 10 and further change-over means 11.

First means 8 consist of a transceiver unit 20 for receiving signals originating from terminal 1, 2 or 3 via switching means 4 and for transmitting coded video signals originating from change-over means 10 and coded audio signals originating from change-over means 11 to terminal 1, 2 or 3 via switching means 4. To this end, transceiver unit 20 is coupled to switching means 4 and coupled to a buffer 21 for receiving coded video signals, and to a buffer 22 for receiving coded audio signals. Buffer 21 is further coupled to change-over means 10, and buffer 22 is further coupled further to change-over means 11. Transceiver unit 20 is further coupled to a shift register 23 for storing signals originating from terminal 1, 2 or 3, a portion of which shift register 23 is coupled to a synchronization unit 25 for detecting a synchronization word in signals originating from terminal 1, 2 or 3, and another portion of which shift register 23 is coupled to a detection unit 24 for detecting a code word in signals originating from terminal 1, 2 or 3. Detection unit 24 is further coupled to second means 9 for feeding said code word to second means 9. First means 8 are further equipped with a processor 26 which is coupled to transceiver unit 20, buffer 21, buffer 22, shift register 23, detection unit 24 and synchronization unit 25, to control first means 8. Second means 9 comprise a buffer 30 coupled to first means 8, to store the detected code word, which buffer 30 is coupled to one side of comparing unit 31, whose other side is coupled to table memory 32 for storing all the possible different code words. Second means 9 further comprise a processor 34 which is coupled to buffer 30, to comparing unit 31 and to table memory 32 and is further coupled to translation unit 33 for generating a control signal to change-over means 10 and for generating a further control signal to further change-over means 11.

Change-over means 10 comprise a change-over switch 40 which, in response to the control signal originating from translation unit 33, interconnects either video coding unit 13 or video coding unit 14 or video coding unit 15 to buffer 21. Further change-over means 11 comprise a change-over switch 50 which, in response to the further control signal originating from translation unit 33, interconnects either audio coding unit 17 or audio coding unit 18 or audio coding unit 19 to buffer 22.

The mode of operation is as follows. A terminal 1, 2 or 3, i.e. a videotelephone which wishes to establish contact with video signal source 12 and audio signal source 16, for example to follow a political debate, transmits a signal, in a manner known to those skilled in the art, to switching means 4 which, for example, set up an interconnection to transceiver unit 20 of coupling device 6. Via transceiver unit 20, said signal, which contains a synchronization word and a code word, is passed on, under the control of processor 26, to shift register 23, whereafter, at a given instant, synchronization unit 25 will detect the synchronization word. This is passed on to processor 26 which, at the same instant or a certain time later, orders detection unit 24 to load the code word held at that instant in a location, associated with detection unit 24, of shift register 23. Said code word, which indicates what terminal video standard and/or terminal video standard mode and terminal audio standard the terminal in question is based on, is passed on to buffer 30, processor 34 being notified thereof. Processor 34 then commands table memory 32 to generate successively all the different code words which are then successively fed to comparing unit 31 which compares them successively with the code word stored in buffer 30. As soon as identity is established by comparing unit 31, said comparing unit 31 notifies processor 34 of the identity, whereupon processor 34 is informed of the code word in question, for example on the basis of the location of said code word in table memory 32. Thereupon, processor 34 informs translation unit 33, for example of the location in table memory 32 of said code word, which location is converted by translation unit 33 into a control signal for change-over switch 40 and a further control signal for change-over switch 50. Thus, on the basis of the code word detected, both change-over switches are set to the position appropriate to the terminal in question, whereupon the video signal coded in a manner appropriate to the terminal and the audio signal coded in a manner appropriate to the terminal are fed to the terminal in question via buffers 21 and 22 and transceiver unit 20 and switching means 4, and the subscriber present at the terminal can to follow the political debate.

As a result of the coupling device according to the invention being used, thousands of subscribers, each with their own terminal which, for example, is based on at most three terminal video standards and/or terminal video standard modes and three terminal audio standards, are able to follow a political debate, only one video signal source or camera and only one audio signal source or microphone being required, and only three video coding units, each set differently, and only three different audio coding units being required. Although a coupling device is still required for each terminal, the cost price of such a coupling device is negligible, compared with the cost price of a video coding unit. It should further be noted that first means 8 can be implemented by means of a generally available so-called H-221 unit, and that second means 9 can largely be implemented by means of a generally available so-called H-242 unit, to which translation unit 33 could be added if required. Such a translation unit can be implemented, in a manner known to those skilled in the art, by employing logic circuits which, for example, convert a code word into a control signal having the value one, two or three, and into a further control signal having the value one, two or three.

Second means 9 could be simplified by, for example, translation unit 33 being coupled directly to buffer 30, which would, however, require somewhat more advanced processing in translation unit 33. Possible code words and/or synchronization words to be added to a coded video signal and/or a coded audio signal for the benefit of the terminal are generated, for example, by processor 26 and, via buffers 21 and 22 and/or transceiver unit 20, are added to a signal intended for the terminal. It is further possible, in a manner known to those skilled in the art, for first means 8 and second means 9 to be implemented entirely or in part by means of software.

Instead of a camera as video source 12 with video coding circuits 13, 14 and 15 coupled thereto and a microphone as audio source 16 and audio coding circuits 17, 18 and 19 coupled thereto it is also conceivable for video signals and audio signals to be stored, for example, on a hard disk, which video signals and audio signals are then fed to the coupling devices via buffers and coding units, and it is even conceivable for video signals and audio signals to be stored in a coded manner on, for example, a hard disk, which coded video signals and audio signals may then be fed to the coupling devices via buffers. Thus a subscriber can, for example, view films via the videotelephone, with the option of checks for unauthorized use being carried out by means of the addition of a unique subscriber code and an associated secret pin code to the signal, originating from the terminal, in a coupling device.

I claim:

1. Coupling device for coupling a terminal to generating means for generating, at least, a first signal coded in a first coding manner and a second signal coded in a second coding manner, the first coding manner and the second coding manner being mutually different, which coupling device comprising:

first means for detecting at least one code word contained in a signal originating from the terminal;

second means, coupled to the first means, for generating a control signal in response to the at least one detected code word; and change-over means, coupled to the first means and to the second means, for receiving, at least, both the first signal coded in a first coding manner as well as the second signal coded in a second coding manner and for feeding, in response to at least the control signal, one of the first and second signals originating from the generating means to the first means.

2. Coupling device according to claim 1, the coupling device being provided with third means for receiving a further signal originating from further generating means and for feeding said further signal to the first means.

3. Coupling device according to claim 2, the third means comprising further change-over means coupled to the first means and to the second means, for receiving, at least, both a first further signal originating from the further generating means and coded in a third coding manner as well as a second further signal originating from the further generating means and coded in a fourth coding manner and for feeding, in response to at least a further control signal originating from the second means, one of the first and second further signals originating from the further generating means to the first means.

4. Coupling device according to claim 3, the first means being provided with a first input/output for coupling to the terminal, a second input/output for coupling to an input/output of the second means, an input for coupling to an output of the change-over means, a further input for coupling to an output of the further change-over means, the second means being provided with a control output for coupling to a control input of the change-over means, and a further control output for coupling to a control input of the further change-over means, the change-over means being provided with a first input for receiving the first signal coded in a first coding manner, and a second input for receiving the second signal coded in a second coding manner, and the further change-over means being provided with a first input for receiving the first further signal coded in the third coding manner, and a second further input for receiving the second further signal coded in the fourth coding manner.

5. System for coupling to at least one terminal and comprising:

generating means for generating, at least, a first signal coded in a first coding manner and a second signal coded in a second coding manner, the first coding manner and the second coding manner being mutually different;

a first coupling device; and a second coupling device wherein each of the first and second coupling devices includes first means for detecting at least one code word contained in a signal originating from a terminal, second means, coupled to the first means, for generating a control signal in response to the at least one detected code word, and change-over means coupled to the first means and to the second means, for receiving, at least, both the first signal coded in a first coding manner as well as the second signal coded in a second coding manner and for feeding, in response to at least the control signal, one of the first and second signals originating from the generating means to the first means.

6. System according to claim 5, the system being provided with further generating means for generating, at least, a further signal, the first coupling device and the second coupling device each being provided with third means for receiving the further signal originating from the further generating means and for feeding said further signal to the first means.

7. System according to claim 6, the third means comprising further change-over means coupled to the first means and to the second means, for receiving, at least, both a first further signal originating from the further generating means and coded in a third coding manner as well as a second further signal originating from the further generating means and coded in a fourth coding manner and for feeding, in response to at least a further control signal originating from the second means, one of the first and second further signals from the further generating means to the first means.

8. System according to claim 5, the system being provided with switching means which are provided with at least two terminal input/outputs, each for coupling to a terminal, and at least two coupling device input/outputs, each for coupling to one of the first and second coupling devices.

9. Method for setting up, via a coupling device, a connection between a terminal and generating means for generating, at least, both a first signal coded in a first coding manner as well as a second signal coded in a second coding manner, the first coding manner and the second coding manner being mutually different, wherein the method comprises the following steps of:

transmitting, from the terminal to the coupling device, a signal which comprises at least one code word, receiving, by the coupling device, the signal which comprises at least one code word, detecting, by the coupling device, the code word and, in response thereto, generating a control signal, transmitting, from the generating means to the coupling device, both the first signal coded in a first coding manner as well as the second signal coded in a second coding manner, and feeding one of the first and second signals received by the coupling device, in response to the control signal, to the terminal.

10. Method according to claim 9, comprising further steps of transmitting a further signal to the coupling device from a further generating means, and feeding the further signal received by the coupling device to the terminal.

11. Method according to claim 9, comprising further steps of transmitting, from the further generating means to the coupling device, both a first further signal coded in a third coding manner as well as a second further signal coded in a fourth coding manner, and feeding one of the coded further signals received by the coupling device, in response to the control signal, to the terminal.

12. Method for setting up, via at least one first and second coupling device, respectively, a connection between, on the one hand, at least a first and a second terminal, respectively, and, on the other hand, generating means for generating, at least, both a first signal coded in a first coding manner as well as a second signal coded in a second coding manner, the first coding manner and the second coding manner being mutually different, wherein the method comprises the following steps of:

transmitting, from the first terminal to the first coupling device, a signal which comprises at least one first code word, receiving, by the first coupling device, the signal which comprises at least one first code word, detecting, by the first coupling device, the first code word and, in response thereto, generating a first control signal, transmitting, from the generating means, to the first coupling device, both the first signal coded in a first coding manner as well as the second signal coded in a second coding manner, feeding the first signal coded in a first manner, in response to the first control signal, to the first terminal, transmitting, from the second terminal to the second coupling device, a signal which comprises at least one second code word, receiving, by the second coupling device, the signal which comprises at least one second code word, detecting, by the second coupling device, the second code word and, in response thereto, generating a second control signal, transmitting, from the generating means, to the second coupling device, both the first signal coded in a first coding manner as well as the second signal coded in a second coding manner, and feeding the second signal coded in a second manner, in response to the second control signal, to the second terminal.

13. Method according to claim 12, comprising further steps of transmitting, with further generating means, a further signal to the first coupling device, and feeding the further signal received by the first coupling device to the first terminal, transmitting, with the further generating means, the further signal to the second coupling device, and feeding the further signal received by the second coupling device to the second terminal.

14. Method according to claim 12, comprising further steps of transmitting, from further generating means, to the first coupling device, both a first further signal coded in a third coding manner as well as a second further signal coded in a fourth coding manner, feeding the first further signal coded in a third manner received by the first coupling device, in response to the first control signal, to the first terminal, transmitting, from the further generating means to the second coupling device, both the first further signal coded in a third coding manner as well as the second further signal coded in a fourth coding manner, and feeding the second further signal coded in a fourth manner received by the second coupling device, in response to the second control signal, to the second terminal.

* * * * *